March 1, 1966     J. S. HOWELL ETAL     3,237,448
EQUIVALENT OPERATING TIME APPARATUS
Filed June 16, 1960
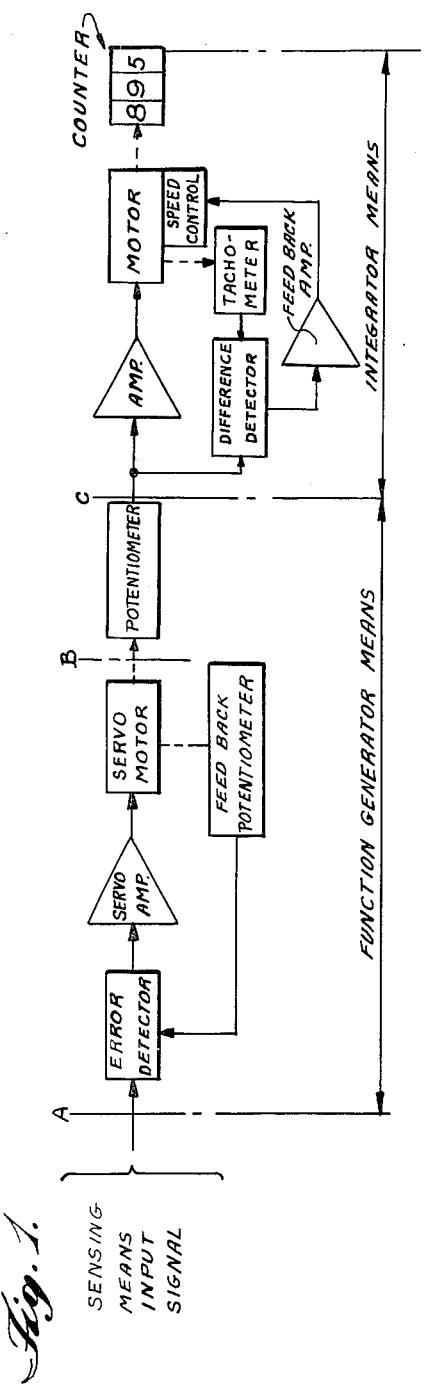
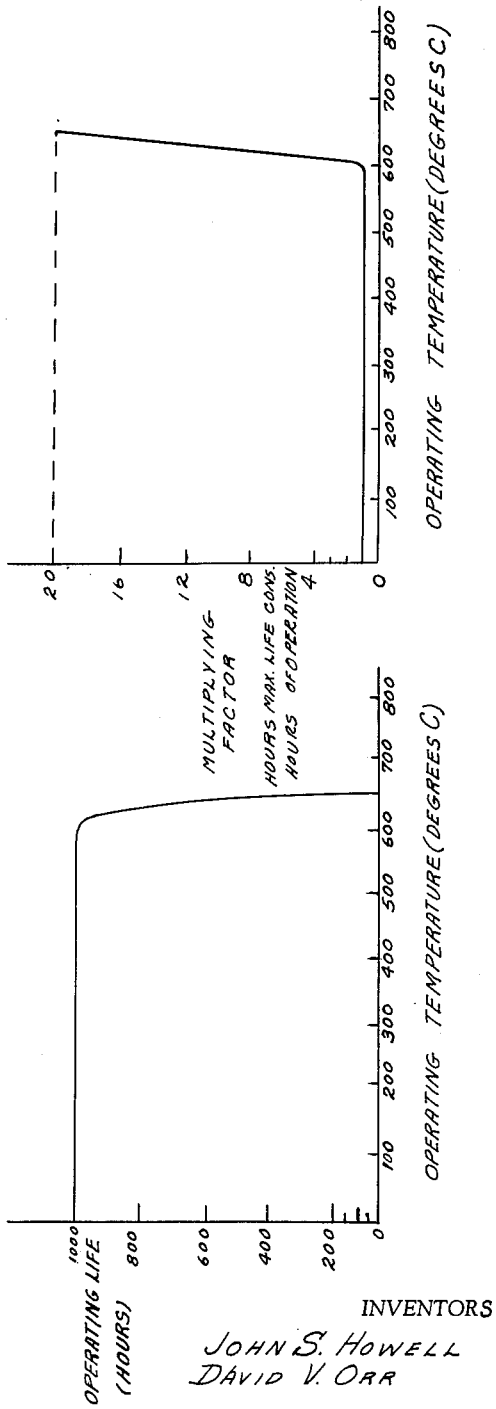
INVENTORS
JOHN S. HOWELL
DAVID V. ORR
BY *Cushman, Darby & Cushman*
ATTORNEYS United States Patent Office 3,237,448
Patented Mar. 1, 1966

3,237,448
EQUIVALENT OPERATING TIME APPARATUS
John S. Howell and David V. Orr, Fort Worth, Tex., assignors to Howell Instrument, Inc., a corporation of Texas
Filed June 16, 1960, Ser. No. 36,537
7 Claims. (Cl. 73—116)

This invention relates to means for determining the elapsed equivalent operating time of an apparatus whose life is a critical function of some measurable variable. The embodiment of the invention disclosed herein for exemplary purposes is concerned with the provision of a time-temperature recording device for recording the operating time of a jet engine as a function of the operating temperature thereof.

As will be appreciated, it is very important that an accurate record of the operating time of a jet engine, or other similar apparatus, be maintained so that the rate at which the operating life of the engine is being consumed, and thus the remainder of available operating life at any given time, may be determined. This information is particularly important for safety reasons, and so that periodic maintenance on the engine may be scheduled. Thus, in the case of a jet engine, the operating life is critically dependent upon its operating temperature. For example, an engine may have an operating life of 1,000 hours while operating at a temperature of 600° C., but of only 50 hours while operating at a temperature of 650° C. Therefore, 50 hours of operation at 650° C. is equivalent to 1,000 hours of operation at 600° C. Since jet engines must operate at temperatures at and in excess of 600° C., to maintain maximum thrust, it is extremely important that the temperature effects be considered when determining the elapsed operating time of the engine, or the percentage of the operating life thereof which has already been consumed.

In the present specification the value of the elapsed operating time of the engine which reflects the effects on the operational life thereof due to temperature variations, will be called the elapsed equivalent operating time. Thus, the equivalent operating time will represent the actual operating time so modified as to take into account the effect of temperature variations on the engine operating life.

While the embodiment disclosed herein is concerned with a device for determining the elapsed equivalent operating time of an apparatus having an operating life dependent upon temperature, the invention is of clearly broader scope, and is applicable to devices for determining the elapsed equivalent operating time of any apparatus having an operating life dependent upon any measurable variable. For example, measurable variables upon which the operating life of an apparatus may depend might include, in addition to temperature, such quantities as pressure, electrical current, solution concentration, and so on. Thus, the present invention may be utilized for any apparatus whose operating life depends upon any measurable variable.

It is therefore a primary object of the present invention to provide means for accurately determining the elapsed operating time of an apparatus having an operating life dependent upon a measurable variable, in such a way that the elapsed operating time thus determined reflects not only the actual time of operation, but in addition, the effect thereon of the measurable variable, whereby the true amount of the operating life which has already been consumed will always be known.

It is another object of the present invention to provide means for the extremely accurate determination of the elapsed equivalent operating time of a jet engine, whose operating life is critically dependent upon its operating temperature, which means may be constructed relatively small in size and light in weight so as to be particularly suited for use with aircraft equipment. A related object is the provision of means which will accomplish this objective with an accuracy heretofore unobtainable with any thing other than large laboratory equipment.

These and other objects of the present invention will become apparent from consideration of the present specification taken in conjunction with the accompanying drawings in which there is shown a single embodiment of the present invention by way of example, and wherein:

FIGURE 1 is a block diagram illustrating the various components which make up an embodiment of the present invention, and the manner in which they are interrelated;

FIGURE 2 is a graph representing the operating life of a jet engine as a function of its operating temperature; and FIGURE 3 is a graph derived from the graph in FIGURE 2 illustrating a multiplying factor representing the rate of consumption of the maximum operating life of a jet engine, as a function of its operating temperature.

Generally speaking, the embodiment of the present invention disclosed herein comprises function generator means responsive to an electrical input signal provided by sensing means responsive to the measurable variable, and integrator means responsive to the output of the function generator means for converting it into the equivalent elapsed operating time of the apparatus involved. Broadly, in the present embodiment, the function generator means comprises a servo system adapted to represent the operating temperature of a jet engine by the position of a shaft, and potentiometer means responsive to the position of the shaft for providing a voltage having an amplitude proportional to the rate at which the maximum operating life of the engine is being consumed. The integrator means broadly comprises means for integrating the voltage across the potentiometer means, representing the rate of engine usage, as a function of time, and readout means responsive to the integrating means for summing and displaying the elapsed equivalent operating time of the engine. Thus, the present invention will continuously monitor the temperature of a jet engine, convert the temperature to a rate of consumption of the engine's operating life, integrate this rate of consumption into an elapsed equivalent operating time, and then sum and display the total elapsed equivalent operating time.

Referring more particularly to the drawings, there is illustrated in FIGURE 1 a block diagram which represents the operating system of an embodiment of the present invention. As will be appreciated, each of the individual components which make up the system are in themselves well known, the invention lying in the manner in which they operate as a system. Thus, the input into the system may be in the form of an electrical signal generated by any suitable sensing means which is capable of converting the values of the variable being measured into an electrical signal. In this embodiment, wherein temperature is the variable, the sensing means may be in the form of engine thermocouples, resistance thermometers, or any other suitable temperature measuring device. The variations of the electrical input signal will therefore represent the variations of the variable, in the present case being the temperature.

The first part of the function generator means which receives the input signal, indicated between A and B, is in essence a servo system comprising an error detector, a servo amplifier, a servomotor, and a feedback potentiometer. The relationship between the respective elements in the servo system is clearly illustrated in FIGURE 1.

Thus, the system receives, as at A, a voltage proportional to the engine temperature from the engine thermocouples or other sensing means. This signal is compared with the voltage from the feedback potentiometer, driven by the servomotor, and any differences between the two signals results in an error signal being fed to the servo amplifier, which modulates and amplifiers the error signal to drive the servomotor. The error voltage will be of proper phase to drive the servomotor, and consequently the feedback potentiometer, in a direction so as to reduce the error signal to zero. In other words, the servomotor will drive the feedback potentiometer in a direction tending to reduce the error signal to zero. Thus, the servomotor output shaft position, indicated at B, will be proportional to the engine temperature.

The second part of the function generator means, as indicated between B and C, is in the form of potentiometer means, which in most applications will be non-linear. The potentiometer means serves a very important function in that it converts the shaft position representing engine temperature into a voltage whose amplitude represents the rate at which the maximum operating life of the engine is being consumed.

To more clearly understand the function of the potentiometer means reference should be made to FIGURES 2 and 3. FIGURE 2 represents the operating life of a jet engine, in hours, as a function of the operating temperature of the engine. This curve, of course, may be determined experimentally through the testing of any given type or model engine. As can be seen, engine operating life at relatively low temperatures remains essentially constant at 1,000 hours, but severely drops off at higher temperatures; for example, down to 50 hours at 650° C. If the jet engine whose life is represented by this curve were to be operated only at temperatures 600° C., or less, there would probably be no need for the present invention, which serves to account for the effect of temperature on the maximum operating life. However, in actual practice the operating temperatures of jet engines frequently exceed 600° C., as when it is desired to obtain maximum thrust. Thus, as will be appreciated, it becomes very important that temperature effects be considered when determining the amount of maximum operating life which has already been consumed, at any given time.

Since, in the present embodiment, wherein the temperature and engine life values are given for exemplary purposes only, the maximum operating life is 1,000 hours, this figure may be used as a base value to represent the operating life under all temperature conditions. Thus, the present invention will so function as to display an elapsed equivalent operating time of 1,000 hours whenever the operating life has been fully consumed even though in actuality the engine has been operating only 50 hours, but at 650° C. In other words, whenever the true operating life of the engine has been wholly consumed, taking into account temperature effects, the readout device will read 1,000 hours, even though the actual time of operation may be considerably less.

It is therefore necessary to calculate a multiplying factor which will represent, at any given temperature, the ratio between the maximum operating life at relatively low temperatures to the actual operating life at the given temperature. By analogy, if a simple clock were to be used to determine the elapsed operating life of the engine, this multiplying factor would represent the amount which this simple clock would have to be speeded up under certain increased temperature conditions to represent the effect thereof on the maximum operating life. The ratio which constitutes the multiplying factor may be computed at each temperature value by means of the graph illustrated in FIGURE 2, and would appear as the graph shown in FIGURE 3.

As will be appreciated, the curve in FIGURE 3 represents the rate at which the maximum operating life of the engine is being consumed, as hours of maximum life consumed, per hour of operation. Thus, as can be seen, the engine when operating at 650° C. is using up or consuming its maximum operating life at 20 times the rate it does when operating at 600° C., or less. In order that this factor may be taken into account in determining the equivalent elapsed operating time of the engine, the potentiometer means is so constructed as to have a resistance curve proportional in shape to the curve illustrated in FIGURE 3. Therefore, by gearing the input shaft of the potentiometer means to the output shaft of the servomotor, the resistance thus established across the potentiometer means will represent the rate at which the maximum operating life of the engine is being consumed.

Accordingly, if a fixed current is made to flow through the potentiometer means, the voltage thereacross will have an amplitude proportional to the rate of engine usage. Depending on the type of integrator means used, the resistance curve of the potentiometer means may be made either directly proportional to the curve in FIGURE 3, or, alternately, it may be made inversely proportional thereto, so that the amplitude of the voltage across the potentiometer means will be directly proportional to the curve. This voltage will exist at position C in FIGURE 1, and serves as the output signal of the function generator means. It is intended that the potentiometer means, as shownin FIGURE 1, be provided with the conventional input shaft, as indicated at B, and that it also be provided with means for establishing a voltage thereacross, the amplitude of which, at any given time, represents the instantaneous rate at which the operating life of the apparatus is being consumed. Of course, the primary component of the potentiometer means is the actual potentiometer itself.

It is the purpose of the integrator means to convert the output voltage of the function generator means into the total elapsed equivalent operating time of the engine. As can be seen, the integrator means comprises an amplifier, a motor having a speed control circuit or winding associated therewith, a tachometer, a difference detector, a feedback amplifier, and a counter or other similar readout device. The output signal of the function generator means as represented by the voltage across the potentiometer means is thus directly amplified and used to drive the motor at a speed proportional thereto. To maintain the speed of the motor accurately proportional to the output signal of the function generator means, there is provided a speed control arrangement or circuit utilizing a tachometer generator driven by the motor. Thus, the output signal of the tachometer is proportional to the speed of the motor. This signal is compared to the output signal of the function generator means in the difference detector to determine whether or not the motor is operating at the exact proper speed. If it is not, the difference detector will generate an error signal which will be amplified by the feedback amplifier and applied to the speed control circuit or winding of the motor to bring the speed thereof to the proper value. The whole purpose of this arrangement is to maintain the motor at a speed which is very accurately proportional to the output signal of the function generator means.

Accordingly, as will be apparent, the rotational speed of the motor will accurately represent the hours of maximum life consumed per hour of operation of the jet engine, and the total number of revolutions of the motor will represent the elapsed equivalent operating time. To sum and readout the elapsed equivalent operating time, there is provided a counter, or other similar readout device, which is geared to the motor shaft to sum the total number of revolutions thereof. The motor circuit may be initially set so that when the output of the function generator means represents minimum operating temperatures, the speed of the motor will be equivalent to one revolution per hour. Thus, when higher temperatures are encountered in the engine, the signal from the function generator means will increase to drive the motor at a higher speed, and for every actual hour of operation at the increased temperatures the number of motor revolutions will represent the equivalent operating time at these temperatures. As will be appreciated, the actual speed of the motor is immaterial and need not be one revolution per hour at low temperatures since it is only relative speeds which are significant, any desired numerical value of speed being easily obtainable by means of gearing or the like.

There are, of course, other methods of integration which may be used. For example, the output signal from the function generator means may be converted to an alternating voltage having a frequency proportional to the amplitude of the output signal, as by means of a voltage controlled oscillator. This signal of varying frequency may then be used to directly derive an electronic counter and electronic readout device, the end result being the same as previously discussed.

We have found that the disclosed embodiment of the present invention is capable of achieving extreme accuracy. As will be apparent, however, this accuracy is dependent upon the accuracy with which the temperature of the engine is monitored. It has been found that by using accurately calibrated thermocouples as the sensing means, and by using an accurate feedback potentiometer, such as one similar in construction to the potentiometer disclosed in Letters Patent No. 2,860,215, it is possible to obtain an accuracy or sensitivity within ±1° C. This extreme accuracy, achieved by the present invention, is believed to have been heretofore unobtainable with other than the use of large laboratory equipment, not suitable for aircraft or portable applications where size and weight are important considerations.

Thus, there is disclosed in the above description, and in the drawings, an exemplary embodiment of our invention which fully and effectively accomplishes the objects of the invention. However, it will be understood by those skilled in the art that the specific details of construction and arrangement of parts, as described, are by way of example only and are not to be construed as limiting the scope of the invention. We, therefore, do not wish to be limited to the precise details set forth, and intend that the invention embody all such features and modifications as are within the scope of the appended claims.

Having thus described our invention, what we claim as new and desire to secure by Letters Patent is:

1. Means for determining the elapsed equivalent operating time of a jet engine having an operating life based upon the temperature generated thereby during operation, comprising: means for generating during said operation a signal which is a function of said temperature and represents the rate of consumption of the maximum operating life of said engine and time-integration means for receiving and integrating said signal with respect to time, whereby the resulting summation represents the elapsed equivalent operating time of said jet engine.

2. Means for determining the elapsed equivalent operating time of an apparatus having an operating life dependent upon a measurable variable, comprising: potentiometer means having an input shaft for varying the resistance across said potentiometer means, the resistance curve of said potentiometer means as a function of the position of said input shaft being proportional to the rate of consumption of the maximum operating life of said apparatus as a function of said variable, whereby the instantaneous value of the resistance across said potentiometer means represents the instantaneous rate said operating life is being consumed; means for monitoring said variable and operating said input shaft during the operation of the apparatus to maintain it in a position proportional to the value of said variable; and time-integration means responsive to the resistance across said potentiometer means for integrating and summing the instantaneous rate of consumption of said operating life with respect to time, whereby the resulting summation represents the elapsed equivalent operating time of said apparatus, and wherein said integrator means comprises motor means, speed control circuit means responsive to the resistance across said potentiometer means to maintain the speed of said motor means proportional thereto, and counter means for counting the revolutions of said motor means, whereby the number of revolutions counted by said counter means represents the equivalent elapsed operating time of said apparatus, and wherein said potentiometer means is provided with means for establishing an electrical output signal proportional to the value of the resistance thereacross and wherein said control circuit means comprises tachometer means driven by said motor means for generating an electrical signal proportional to the speed of said motor means, difference detector means for comparing said potentiometer output signal and said tachometer output signal generally thereby an error signal if the speed of said motor means is not correct, and feedback amplifier means for amplifying said error signal and applying it to said motor means to correct the speed thereof.

3. Means for determining the elapsed equivalent operating time of a jet engine having an operating life dependent upon the operating temperature of said engine generated thereby during operation thereof, said engine being provided with sensing means responsive to said temperature for converting the values thereof into an electrical signal, comprising: servomotor means responsive to said electrical signal and having an output shaft, said servomotor means for maintaining said output shaft in a position proportional to the value of said variable; potentiometer means responsive to the position of said output shaft and driven thereby, the resistance curve of said potentiometer means as a function of the position of said output shaft being proportional to the rate of consumption of the operating life of said apparatus as a function of the value of said variable; motor means; speed control circuit means for maintaining the speed of said motor means proportional to the resistance across said potentiometer means; and counter means for counting the revolutions of said motor means, the number of revolutions counted by said counter means representing the equivalent elapsed operating time of said jet engine.

4. In combination means for determining the elapsed equivalent operating time of a jet engine having an operating life dependent upon the operating temperature of said engine generated during operation thereof, said engine being provided with sensing means responsive to said temperature for converting the values thereof into an electrical signal, said determining means comprising: potentiometer means having an input shaft for varying the resistance thereacross, the resistance curve of said potentiometer means as a function of the position of said input shaft being proportional to the rate of consumption of the maximum operating life of said engine as a function of said variable; first motor means responsive to said electrical signal for operating said input shaft to maintain it in a position proportional to the value of said variable; second motor means; speed control circuit means for maintaining the speed of said second motor means proportional to the resistance across said potentiometer means; and counter means for counting the revolutions of said second motor means, the number of revolutions counted by said counter means repreesnting the equivalent elapsed operating time of said jet engine.

5. Means for determining the elapsed equivalent operating time of a jet engine, said jet engine being provided with thermocouples or the like for generating an electrical signal proportional to the operating temperature of said engine, comprising: potentiometer means having an input shaft for varying the resistance across said potentiometer means, the resistance curve of said potentiometer means as a function of the position of said input shaft being proportional to the rate of consumption of the maximum operating life of said jet engine as a function of the operating temperature thereof, whereby the instantaneous value of the resistance across said potentiometer means represents the instantaneous rate said operating life is being consumed; means responsive to said electrical signal for operating said input shaft to maintain it in a position proportional to the value of said operating temperature; integrator means responsive to the resistance across said potentiometer means for integrating and summing the instantaneous rate of consumption of said operating life with respect to time, whereby the resulting summation represents the elapsed equivalent operating time of said jet engine.

6. Means as claimed in claim 5, wherein said means for operating said input shaft comprises servomotor means having an output shaft, said output shaft being connected to said input shaft of said potentiometer means to operate same.

7. Means as claimed in claim 5, wherein said integrator means comprises motor means, speed control circuit means responsive to the resistance across said potentiometer means to maintain the speed of said motor means proportional thereto, and counter means for counting the revolutions of said motor means, whereby the number of revolutions counted by said counter means represents the equivalent elapsed operating time of said jet engine.

References Cited by the Examiner

UNITED STATES PATENTS

| | | | |
|---|---|---|---|
| 2,159,236 | 5/1939 | Uher | 73—115 |
| 2,359,767 | 10/1944 | Keinath | 73—113 |
| 2,645,118 | 7/1953 | Anderson | 73—116 |
| 2,688,875 | 9/1954 | De Boisblanc | 73—304 |
| 2,897,426 | 7/1959 | Hotine | 235—197 X |
| 2,913,180 | 11/1959 | Rusk | 235—183 |

FOREIGN PATENTS 933,954  9/1955  Germany.

RICHARD C. QUEISSER, *Primary Examiner.*

CHARLES A. CUTTING, JOSEPH P. STRIZAK,
*Examiners.*